USOO9554428B2

United States Patent
Hsu et al.

(10) Patent No.: US 9,554,428 B2
(45) Date of Patent: Jan. 24, 2017

(54) LOW-FLICKER LIGHT-EMITTING DIODE LIGHTING DEVICE

(71) Applicant: IML International, Grand Cayman (KY)

(72) Inventors: Horng-Bin Hsu, Taipei (TW); Yung-Hsin Chiang, New Taipei (TW); Yi-Mei Li, New Taipei (TW)

(73) Assignee: IML International, Grand Cayman (KY)

( * ) Notice: Subject to any disclaimer, the term of this patent is extended or adjusted under 35 U.S.C. 154(b) by 0 days.

(21) Appl. No.: 14/838,329

(22) Filed: Aug. 27, 2015

(65) Prior Publication Data

US 2016/0381744 A1 Dec. 29, 2016

Related U.S. Application Data (60) Provisional application No. 62/183,752, filed on Jun. 24, 2015.

(51) Int. Cl.
*H05B 33/08* (2006.01)
(52) U.S. Cl.
CPC ................. *H05B 33/0812* (2013.01)
(58) Field of Classification Search
None
See application file for complete search history.

(56) References Cited

U.S. PATENT DOCUMENTS

| 9,439,254 B2 | 9/2016 | Shin |
| 2014/0097754 A1 | 4/2014 | Chiang |
| 2015/0015164 A1 | 1/2015 | Hsu |
| 2016/0143096 A1* | 5/2016 | Lin ........................ H05B 37/02 315/121 |

FOREIGN PATENT DOCUMENTS

| CN | 104718799 A | 6/2015 | |
| JP | 200359676 A | 2/2003 | |
| JP | 2004192833 A | 7/2004 | |
| JP | 2011100702 A | 5/2011 | |
| JP | 2012244137 A | 12/2012 | |
| KR | 1020130113169 A | 10/2013 | |
| KR | 1020140044257 A | 4/2014 | |
| KR | 1020150007206 A | 1/2015 | |
| TW | 201433209 A | 8/2014 | |
| TW | 201444409 A | 11/2014 | |
| TW | M496315 U | 2/2015 | |
| WO | WO 2015190646 A1 * | 12/2015 | ............. H05B 37/02 |

* cited by examiner

*Primary Examiner* — Dedei K Hammond
(74) *Attorney, Agent, or Firm* — Winston Hsu; Scott Margo (57) ABSTRACT

An LED lighting device driven by a rectified AC voltage includes a luminescent device, a charge storage unit and a current controller. The charge storage unit is configured to turn on the luminescent device when the rectified AC voltage is still insufficient to turn on the luminescent device. The current control unit is configured to allow the LED lighting device to have constant luminance regardless of the level of the rectified AC voltage, thereby improving flicker phenomenon.

14 Claims, 9 Drawing Sheets

LOW-FLICKER LIGHT-EMITTING DIODE LIGHTING DEVICE

CROSS REFERENCE TO RELATED APPLICATIONS

This application claims the benefit of U.S. provisional application No. 62/183,752 filed on 2015 Jun. 24.

BACKGROUND OF THE INVENTION

1. Field of the Invention

The present invention is related to an LED lighting device, and more particularly, to a low-flicker LED lighting device.

2. Description of the Prior Art

A light-emitting diode (LED) lighting device directly driven by a rectified alternative-current (AC) voltage usually adopts a plurality of LEDs coupled in series in order to provide required luminance. An LED lighting device is configured to modulate luminous flux and intensity. This time variation is commonly referred to as flicker. LED flicker, whether perceptible or not, has been a concern of the lighting community because of its potential human impacts, which range from distraction, mild annoyance to neurological problems. Therefore, there is a need for an LED lighting device capable of improving the flicker phenomenon.

SUMMARY OF THE INVENTION

The present invention provides an LED lighting device which includes a luminescent device, a charge storage unit and a current controller. The luminescent device is driven by a rectified AC voltage for providing light according to first current. The charge storage unit is configured to supply the first current when the rectified AC voltage is smaller than a voltage established across the charge storage unit, thereby keeping the luminescent device turned on. The current controller includes a first current control unit and a second current control unit. The first current control unit is coupled in series to the luminescent device and configured to regulate the first current so that the first current does not exceed a first current setting. The second current control unit is coupled in series to the first current control unit and coupled in series to the charge storage unit, and configured to regulate second current so that the second current does not exceed a second current setting, wherein the second current is an overall current of the LED lighting device.

These and other objectives of the present invention will no doubt become obvious to those of ordinary skill in the art after reading the following detailed description of the preferred embodiment that is illustrated in the various figures and drawings.

DETAILED DESCRIPTION

FIGS. 1~8 are diagrams of LED lighting devices 101~108 according to embodiments of the present invention. Each of the LED lighting devices 101~108 includes a power supply circuit 110, a first luminescent device 12, a current controller 20, and a first charge storage unit C1. Each of the LED lighting devices 103 and 107 further includes a second luminescent device 14. Each of the LED lighting devices 104 and 108 further includes a second charge storage unit C2, a sensing resistor $R_S$, and a path controller D1. Each of the LED lighting devices 105~108 further includes a voltage clamping unit $Z_V$.

The power supply circuit 110 is configured to receive an AC voltage VS having positive and negative periods and convert the output of the AC voltage VS in the negative period using a bridge rectifier 112, thereby providing a rectified AC voltage $V_{AC}$, whose value varies periodically with time, for driving the LED lighting devices 101~108. N1 represents the positive output end of the power supply circuit 110, while N2 represents the negative output end of the power supply circuit 110. In another embodiment, the power supply circuit 110 may receive any AC voltage VS, perform voltage conversion using an AC-AC converter, and rectify the converted AC voltage VS using the bridge rectifier 112, thereby providing the rectified AC voltage $V_{AC}$ whose value varies periodically with time. However, the configuration of the power supply circuit 110 does not limit the scope of the present invention.

In the LED lighting devices 101~108, each of the luminescent devices 12 and 14 may adopt a single LED or multiple LEDs coupled in series. FIGS. 1~8 depict the embodiment using multiple LEDs which may consist of single-junction LEDs, multi-junction high-voltage (HV) LEDs, or any combination of various types of LEDs. However, the types and configurations of the luminescent devices 12 and 14 do not limit the scope of the present invention.

In the LED lighting devices 101~108, each of the charge storage units C1~C2 may adopt a capacitor, or one or multiple devices which provides similar function. However, the types and configurations of the charge storage units C1~C2 do not limit the scope of the present invention.

In the LED lighting devices 101~108, each of the path controllers D1~D2 may adopt a diode, a diode-connected field effect transistor (FET), a diode-connected bipolar junction transistor (BJT) or other devices having similar function, or one or multiple devices which provides similar function. However, the types and configurations of the path controllers D1~D2 do not limit the scope of the present invention. When the voltage established across a specific path controller exceeds its turn-on voltage, the specific path controller is forward-biased and functions as a short-circuited device; when the voltage established across the specific path controller does not exceed its turn-on voltage, the specific path controller is reverse-biased and functions as an open-circuited device.

For illustrative purposes, the following symbols are used to explain the operation of the LED lighting devices 101~108 throughout the description and figures. $V_{C1}$ and $V_{C2}$ represent the voltages established across the charge storage units C1 and C2, respectively. $I_{C1}$ and $I_{C2}$ represent the current flowing through the charge storage units C1 and C2, respectively. $V_{LED}$ represents the voltage established across the luminescent device 12. $I_{LED}$ represents the current flowing through the luminescent device 12. $I_{TOT}$ represents the overall current flowing through the LED lighting devices 101~108.

Figure 1:
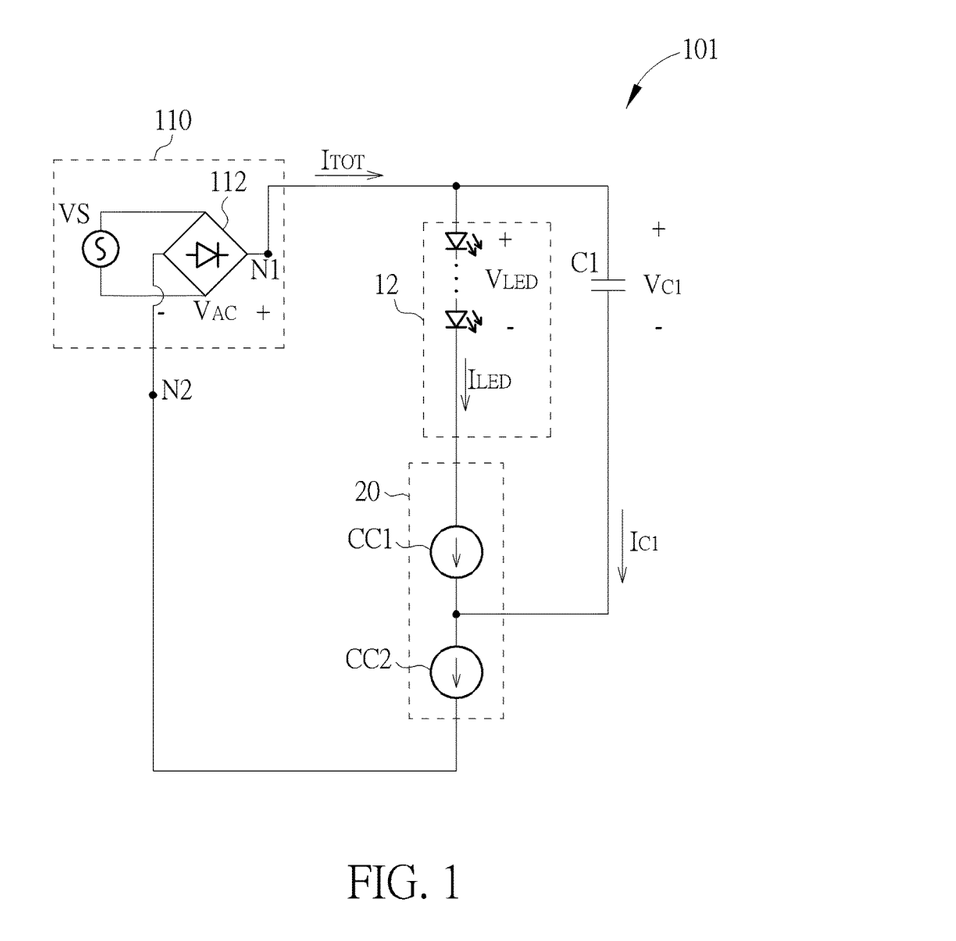
FIG. 1 is a diagram of an LED lighting device according to an embodiment of the present invention.
Figure 2:
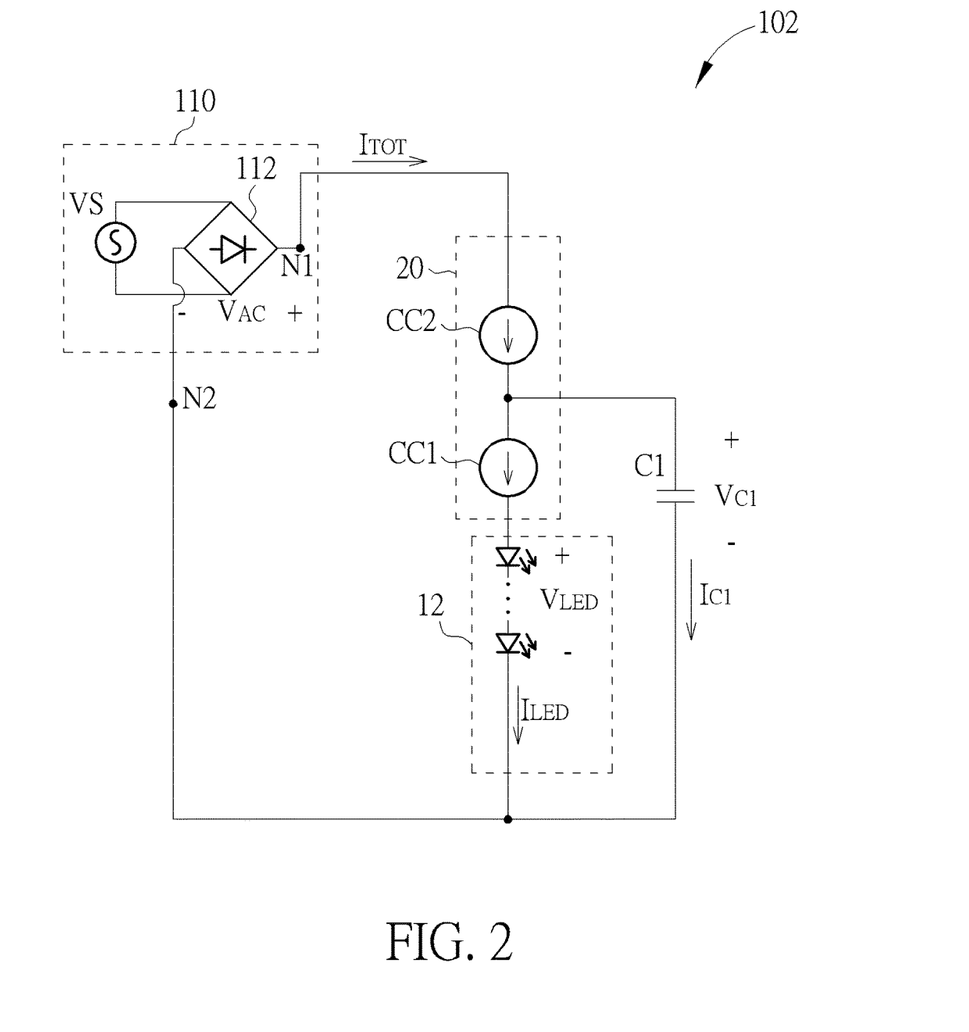
FIG. 2 is a diagram of an LED lighting device according to another embodiment of the present invention.

In the LED lighting device 101 depicted in FIG. 1 and the LED lighting device 102 depicted in FIG. 2, the current controller 20 includes two current control units CC1 and CC2 coupled in series. The current control unit CC1 with a first current setting $I_{SET1}$ is coupled in series to the luminescent device 12, wherein the charge storage unit C1 is coupled in parallel with the serially-coupled current control unit CC1 and the luminescent device 12. The current control unit CC2 with a second current setting $I_{SET2}$ is coupled in series to the charge storage unit C1. In the LED lighting device 101, the current control unit CC2 is coupled between the current control unit CC1 and the negative output end N2 of the power supply circuit 110. In the LED lighting device 102, the current control unit CC2 is coupled between the positive output end N1 of the power supply circuit 110 and the current control unit CC1.

Figure 3:
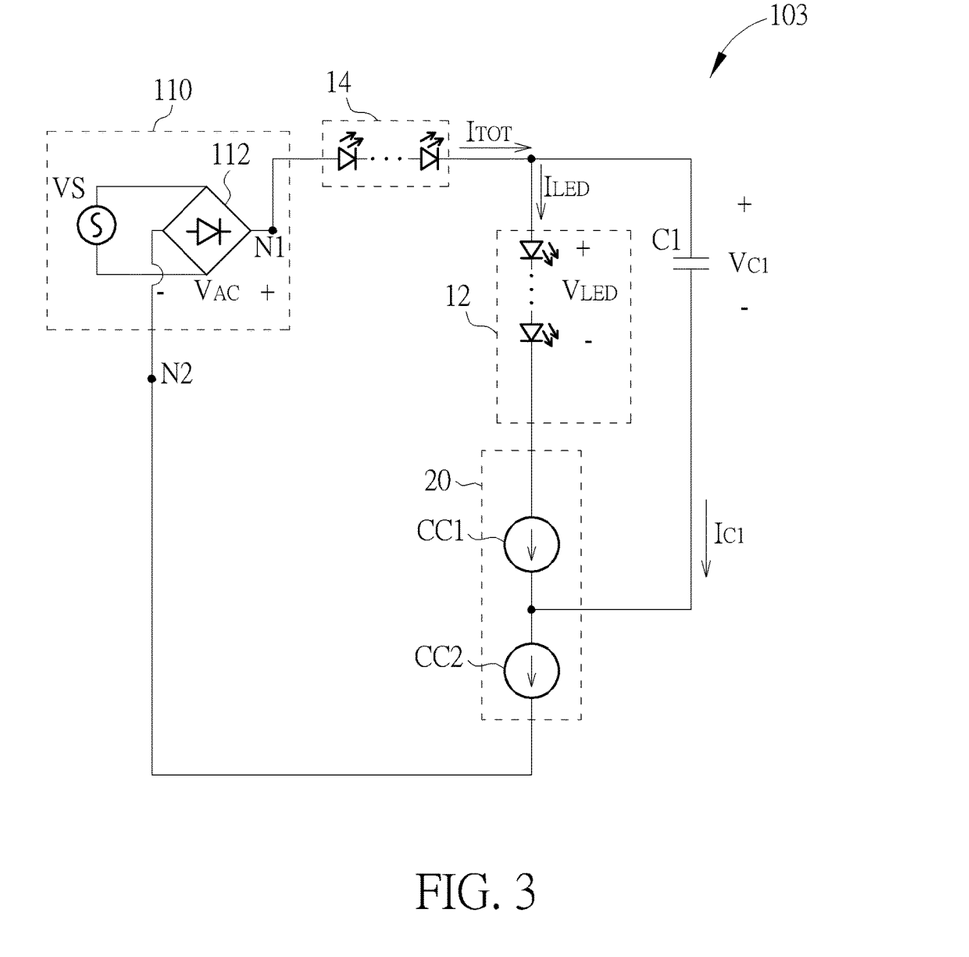
FIG. 3 is a diagram of an LED lighting device according to another embodiment of the present invention.

In the LED lighting device 103 depicted in FIG. 3, the current controller 20 includes two current control units CC1 and CC2 coupled in series. The current control unit CC1 with a first current setting $I_{SET1}$ is coupled in series to the luminescent device 12, wherein the charge storage unit C1 is coupled in parallel with the serially-coupled current control unit CC1 and the luminescent device 12. The current control unit CC2 with a second current setting $I_{SET2}$ is coupled in series to the charge storage unit C1. A first end of the luminescent device 14 is coupled to the positive output end N1 of the power supply circuit 110. A second end of the luminescent device 14 is coupled to the luminescent device 12 and the charge storage unit C1.

During the rising period or the falling period of the rectified AC voltage $V_{AC}$ when the voltage $V_{CC1}$ or $V_{CC2}$ established across the current control unit $CC_1$ or $CC_2$ does not exceed the cut-in voltage of the current control unit $CC_1$ or $CC_2$, the current control unit $CC_1$ or $CC_2$ operates in a cut-off mode and functions as an open-circuited device.

During the rising period or the falling period of the rectified AC voltage $V_{AC}$ when the voltage $V_{CC1}$ or $V_{CC2}$ established across the current control unit $CC_1$ or $CC_2$ exceeds the cut-in voltage of the current control unit $CC_1$ or $CC_2$ but does not exceed the drop-out voltage of the current control unit $CC_1$ or $CC_2$, the current control unit $CC_1$ or $CC_2$ is not completely turned on and operates as voltage-controlled devices in a linear mode so that the current $I_{LED}$ or the current $I_{TOT}$ changes with the voltage $V_{AC}$ in a specific manner. For example, if each of the current control units $CC_1$~$CC_2$ adopts an N-type metal-oxide-semiconductor (NMOS) transistor, the relationship between the current $I_{LED}$ and the voltage $V_{CC1}$ or the relationship between the current $I_{TOT}$ and the voltage $V_{CC2}$ may be determined by the relationship between the drain current and the drain-to-source voltage of the NMOS transistor.

During the rising period or the falling period of the rectified AC voltage $V_{AC}$ when the voltage $V_{CC1}$ or $V_{CC2}$ established across the current control unit $CC_1$ or $CC_2$ exceeds the drop-out voltage of the current control unit $CC_1$ or $CC_2$, the current $I_{LED}$ reaches the maximum current setting $I_{SET1}$ of the current control unit $CC_1$ or the current $I_{TOT}$ reaches the maximum current setting $I_{SET2}$ of the current control unit $CC_2$. In response, the current control unit $CC_1$ or $CC_2$ switches to a constant-current mode and functions as a current limiter so that the current $I_{LED}$ or the current $I_{TOT}$ may be maintained at the constant value $I_{SET1}$ or $I_{SET2}$ instead of changing with the voltage $V_{CC2}$ or $V_{CC3}$.

Figure 9:
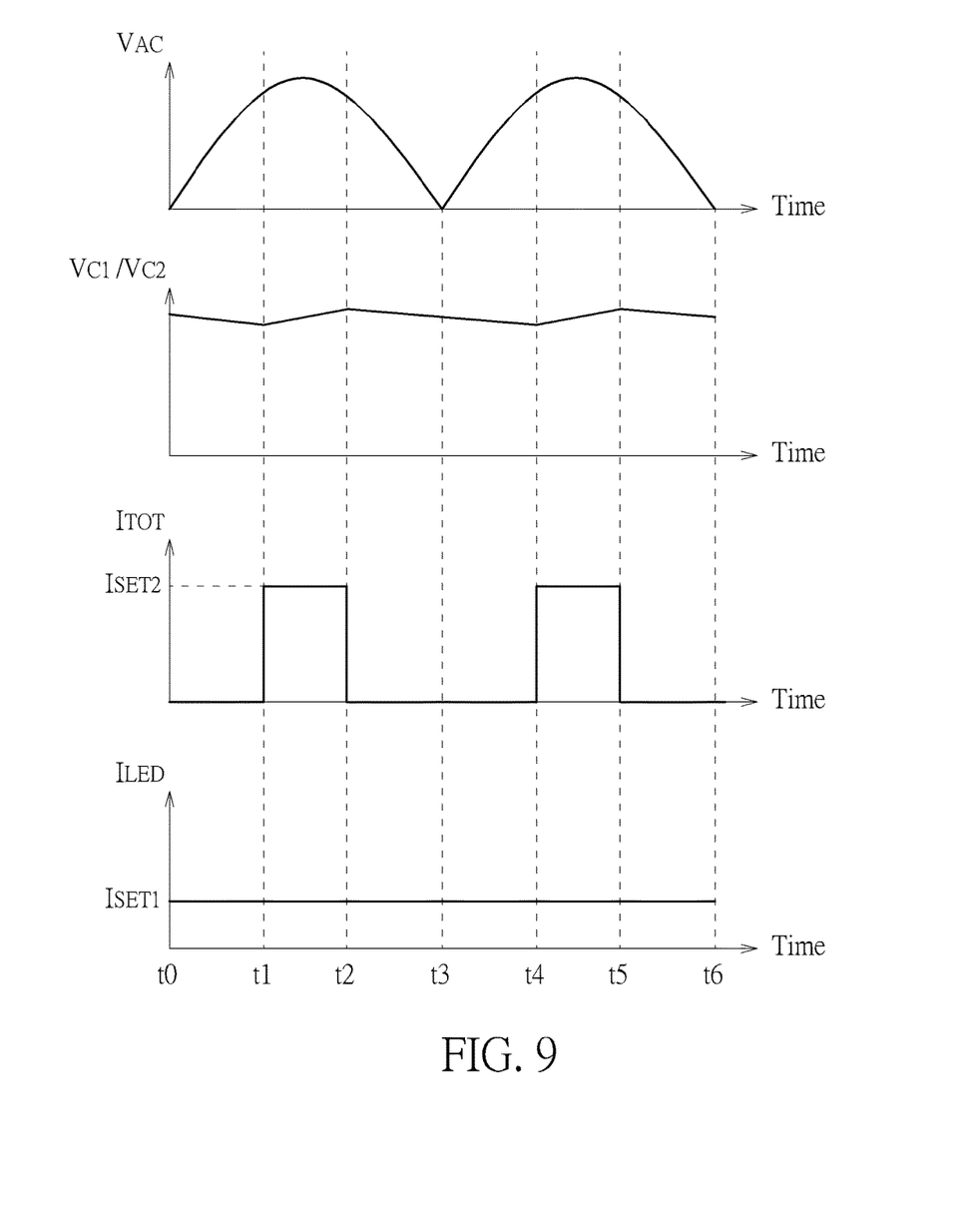
FIG. 9 is a diagram illustrating the current/voltage characteristics of an LED lighting device according to an embodiment of the present invention.

FIG. 9 is a diagram illustrating the current/voltage characteristics of the LED lighting device according to the present invention. Since the voltage $V_{LED}$ established across the luminescent device 12 is associated with the rectified AC voltage $V_{AC}$ whose value varies periodically with time, two cycles between $t_0$~$t_6$ are used for illustration, wherein the period between $t_0$~$t_1$ and $t_3$~$t_4$ belongs to the rising period of the rectified AC voltage $V_{AC}$ and the period between $t_2$~$t_3$ and $t_5$~$t_6$ belongs to the falling period of the rectified AC voltage $V_{AC}$.

During the rising period or the falling period of the rectified AC voltage $V_{AC}$ when the voltage $V_{AC}$ is larger than the sum of the cut-in voltages of the luminescent device 12 and the current control units CC1~CC2 (i.e., $V_{AC} > (V_{C1} + V_{CC2})$), the voltage $V_{LED}$ is sufficiently large to turn on the luminescent device 12, and the current control units CC1~CC2 are both in function. More specifically, between $t_1$~$t_2$ and $t_4$~$t_6$, the luminescent device 12 may be maintained in ON state by the rectified AC voltage $V_{AC}$. The current control unit CC1 is configured to clamp the current $I_{LED}$ at $I_{SET1}$, and the current control unit CC2 is configured to clamp the current $I_{TOT}$ at $I_{SET2}$. During these periods, the rectified AC voltage $V_{AC}$ is also charging the charge storage unit C1 by an amount of ($I_{SET2} - I_{SET1}$), and the voltage $V_{C1}$ thus gradually increases.

During the rising period or the falling period of the rectified AC voltage $V_{AC}$ when the voltage $V_{AC}$ is smaller than the sum of the cut-in voltages of the luminescent device 12 and the current control unit CC1~CC2 (i.e., $V_{AC} < (V_{C1} + V_{CC2})$), the voltage $V_{LED}$, further supplied by the charge storage unit C1, is still sufficient to turn on the luminescent device 12. Under such circumstance, the current control unit CC1 is in function, but the current control unit CC2 is not in function. More specifically, between $t_0$~$t_1$, $t_2$~$t_4$ and $t_5$~$t_6$, the current $I_{LED}$ is supplied by the energy discharged from the charge storage unit C1, thereby maintaining the luminescent device 12 in ON state. The current control unit CC1 is configured to clamp the current $I_{LED}$ at $I_{SET1}$, and the current control unit CC2 is not regulating any current ($I_{TOT}$=0). During these periods, the charge storage unit C1 is discharging through the luminescent device 12, and the voltage $V_{C1}$ thus gradually decreases.

As depicted in FIG. 9, the introduction of the charge storage unit C1 allows the luminescent device 12 to have long turn-on time or to be constantly turned on. The introduction of the current control unit CC1~CC2 allows the LED lighting device to have constant luminance regardless of the level of the rectified AC voltage $V_{AC}$, thereby improving the flicker phenomenon.

Figure 4:
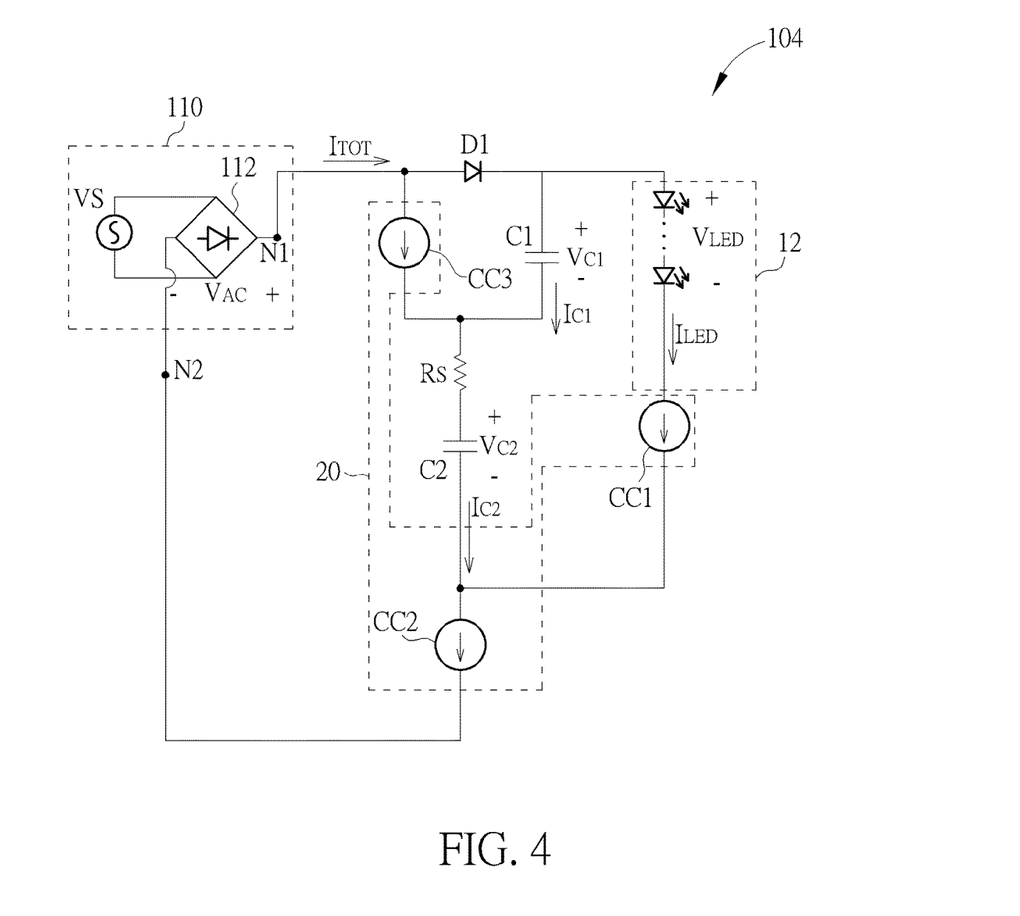
FIG. 4 is a diagram of an LED lighting device according to another embodiment of the present invention.
Figure 5:
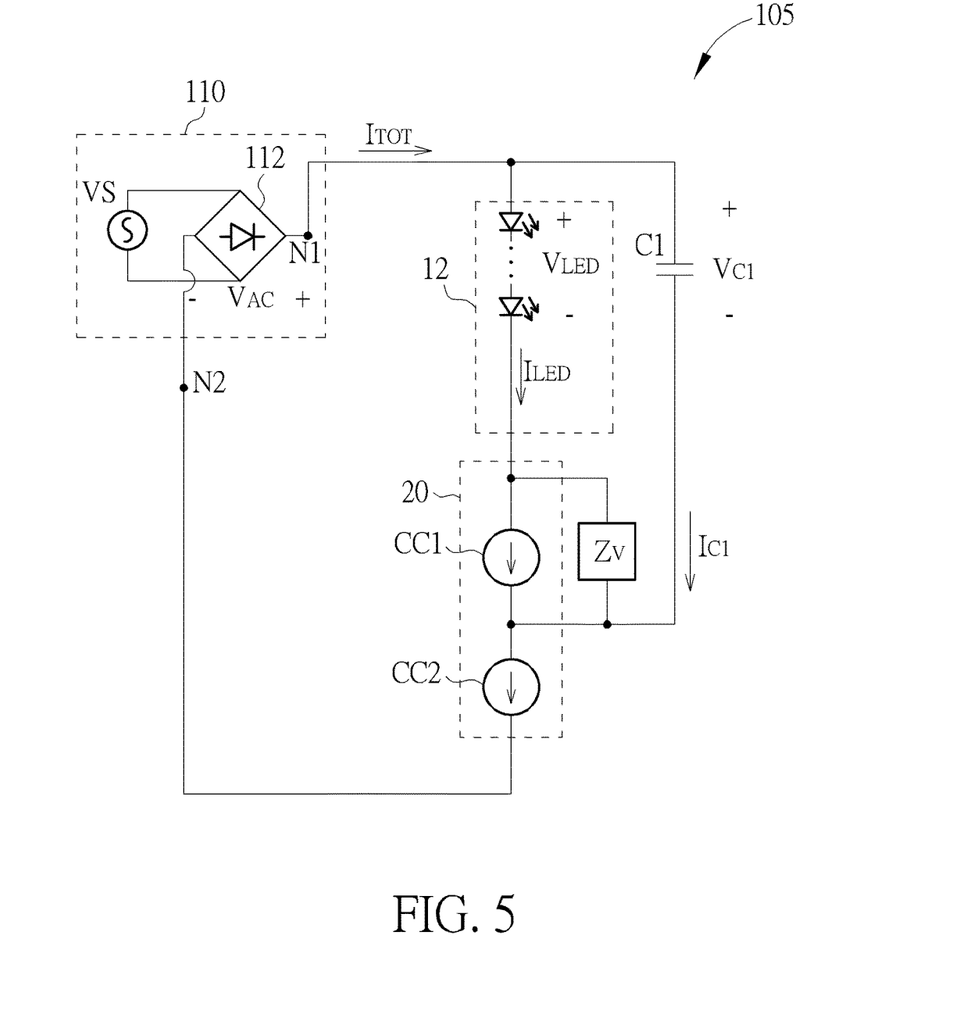
FIG. 5 is a diagram of an LED lighting device according to another embodiment of the present invention.
Figure 6:
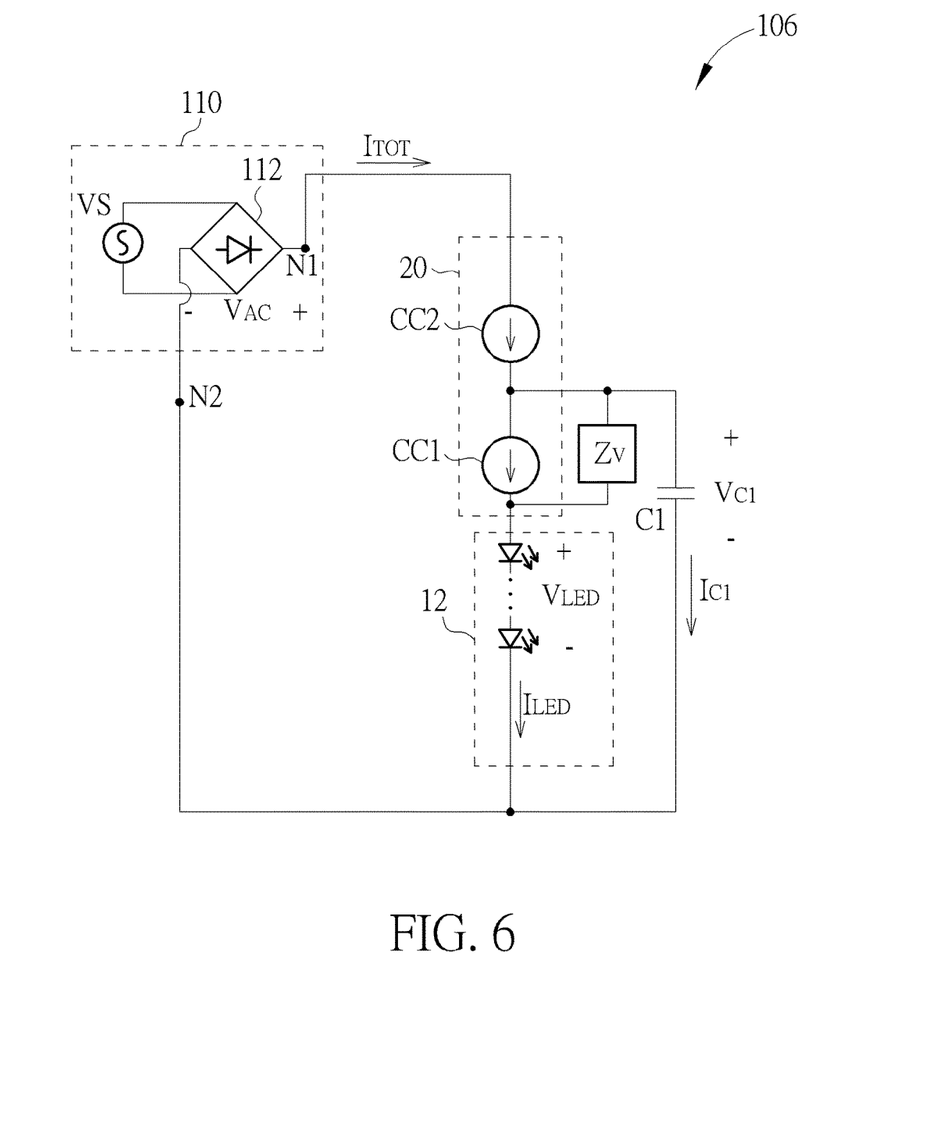
FIG. 6 is a diagram of an LED lighting device according to another embodiment of the present invention.
Figure 7:
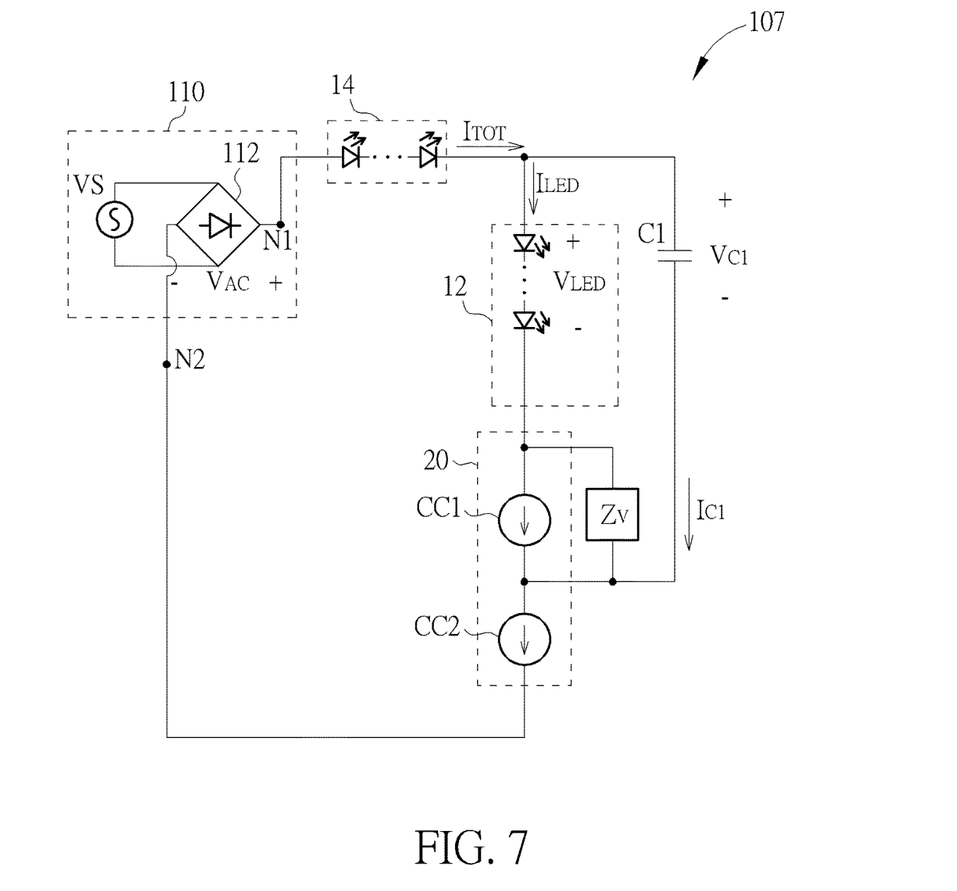
FIG. 7 is a diagram of an LED lighting device according to another embodiment of the present invention.
Figure 8:
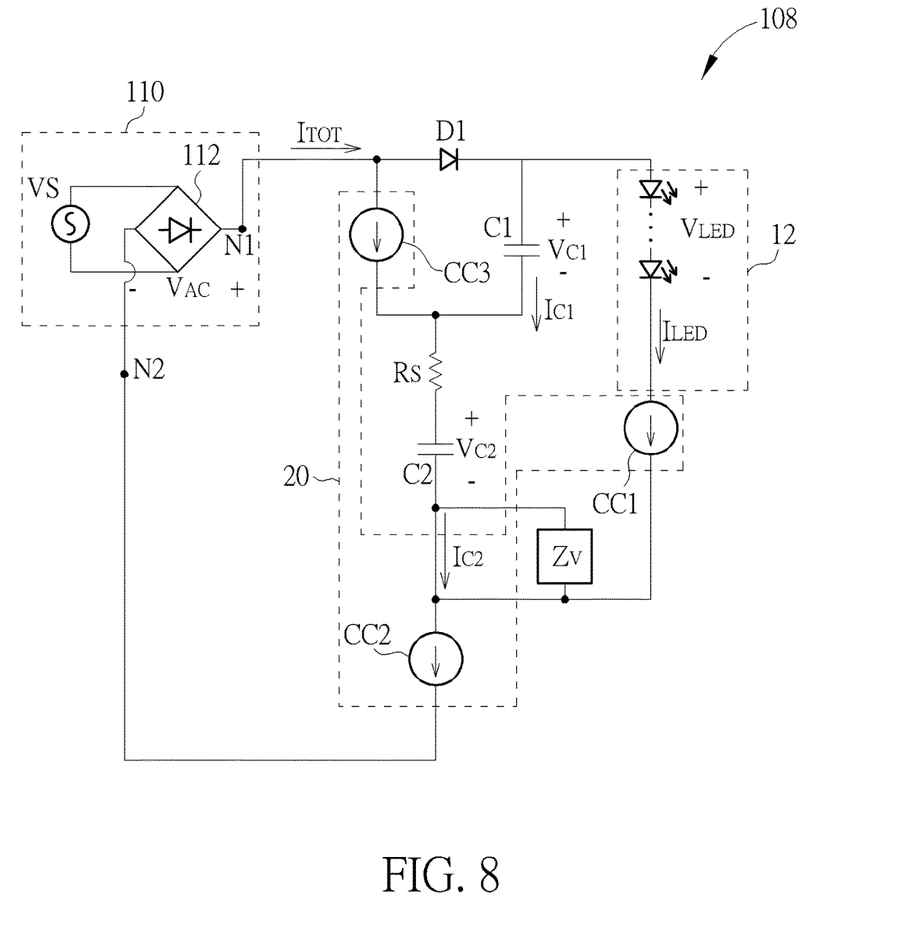
FIG. 8 is a diagram of an LED lighting device according to another embodiment of the present invention.

In the LED lighting device 104 depicted in FIG. 4, the current controller 20 includes three current control units CC1~CC3. The current control unit CC1 with a first current setting $I_{SET1}$ is coupled in series to the luminescent device 12 to regulate the current $I_{LED}$. The current control unit CC2 with a second current setting $I_{SET2}$ is coupled in series to the current control unit CC1 and coupled in series to the charge storage unit C2 to regulate the overall current $I_{TOT}$. The current control unit CC3 with a third current setting $I_{SET3}$ is coupled in parallel with the charge storage unit C1 and coupled in series to the charge storage unit C2 to regulate the current $I_{C2}$ flowing through the charge storage unit C2. The charge storage units C1~C2 and the sensing resistor $R_S$, coupled in series to each other, are coupled in parallel with the current control unit CC1 and the luminescent device 12. The sensing resistor $R_S$ is used to adjust the length of the turn-on time of the current control unit CC3, and may optionally be omitted. The path controller D1 is coupled to the current control unit CC3, the charge storage unit C1 and the luminescent device 12 in a configuration so as to prevent the charge storage unit C1 from discharging through the current control unit CC3. In the present invention, the value of $I_{SET2}$ is larger than the value of $I_{SET1}$, and the value of $I_{SET3}$ is smaller than $(I_{SET2}-I_{SET1})$.

The current/voltage characteristics depicted in FIG. 9 may also be used for illustrating the operation of the LED lighting device 104. During the rising period or the falling period of the rectified AC voltage $V_{AC}$ when the voltage $V_{AC}$ is larger than $(V_{C1}+V_{C2}+V_{CC2})$, the voltage $V_{LED}$ is sufficiently large to turn on the luminescent device 12, the path controller D1 is forward-biased, the current control units CC1~CC2 are in function, and the current control unit CC3 is not in function. More specifically, between $t_1$~$t_2$ and $t_4$~$t_5$, the luminescent device 12 may be maintained in ON state by the rectified AC voltage $V_{AC}$. The current control unit CC1 is configured to clamp the current $I_{LED}$ at $I_{SET1}$, and the current control unit CC2 is configured to clamp the current $I_{TOT}$ at $I_{SET2}$. During these periods, the rectified AC voltage $V_{AC}$ is also charging the charge storage units C1~C2 by an amount of $(I_{SET2}-I_{SET1})$, and the voltages $V_{C1}$ and $V_{C2}$ thus gradually increase.

During the rising period or the falling period of the rectified AC voltage $V_{AC}$ when the voltage $V_{AC}$ becomes smaller than $(V_{C1}+V_{C2}+V_{CC2})$ but is still larger than $(V_{C2}+V_{CC2})$, the path controller D1 becomes reverse-biased, the current control units CC1 and CC3 are in function, and the current control unit CC2 is not in function. More specifically, between $t_0$~$t_1$, $t_2$~$t_4$ and $t_5$~$t_6$, the charge storage units C1 and C2 start to supply the current $I_{LED}$, which is clamped by the current control unit CC1 at $I_{SET1}$. The current control unit CC3 supplies current so that the current $I_{C2}$ charging the charge storage unit C2 may be clamped at $I_{SET3}$. During these periods when the charge storage units C1 and C2 are discharging through the luminescent device 12, since only the charge storage unit C2 is charged by $I_{SET3}$, the value of $(V_{C1}+V_{C2})$ thus gradually decreases.

During the rising period or the falling period of the rectified AC voltage $V_{AC}$ when the voltage $V_{AC}$ becomes smaller than the voltage $(V_{C2}+V_{CC2})$, the voltage $V_{LED}$ is sufficient to turn on the luminescent device 12, but the current control units CC2~CC3 are not in function. More specifically, between $t_0$~$t_1$, $t_2$~$t_4$ and $t_5$~$t_6$, the current $I_{LED}$ is supplied by the energy discharged from the charge storage units C1 and C2, thereby maintaining the luminescent device 12 in ON state. The current control unit CC1 is configured to clamp the current $I_{LED}$ at $I_{SET1}$, and the current control units CC2~CC3 are not regulating any current. During these periods, since the charge storage units C1 and C2 are discharging through the luminescent device 12, both the voltages $V_{C1}$ and $V_{C2}$ thus gradually decrease.

As depicted in FIG. 9, the introduction of the charge storage units C1~C2 allow the luminescent device 12 to have long turn-on time or to be consistently turned on. The introduction of the current control units CC1~CC3 allow the LED lighting device 104 to have constant luminance regardless of the level of the rectified AC voltage $V_{AC}$, thereby improving the flicker phenomenon.

The LED lighting devices 105~108 depicted in FIGS. 5~8 are similar to the LED lighting devices 101~104 depicted in FIGS. 1~4, respectively. The difference is that each the LED lighting devices 105~108 further includes the voltage clamping unit $Z_V$ coupled in parallel with the current control unit CC1. The voltage clamping unit $Z_V$ can limit the voltage drop of the current control unit CC1, as well as the corresponding voltage $V_{C1}$. The current/voltage characteristics depicted in FIG. 9 may also be used for illustrating the operation of the LED lighting devices 105~108. In the present invention, the voltage clamping unit $Z_V$ may adopt an LED, a Zener diode, or other devices providing similar function. However, the type of the voltage clamping unit $Z_V$ does limit the scope of the present invention.

As well-known to those skilled in the art, LED flicker is periodic, with its waveforms characterized by variations in amplitude, average level, periodic frequency, shape, and/or duty cycle. Percent Flicker and Flicker Index are metrics historically used to quantify flicker, as represented by the following formula:

$$\text{Percent Flicker} = 100\% \times \frac{\text{MAX} - \text{MIN}}{\text{MAX} + \text{MIN}} \quad (1)$$

$$\text{Flicker Index} = \frac{\text{AREA1}}{\text{AREA1} + \text{AREA2}} \quad (2)$$

In formula (1), MAX represents the maximum intensity/flux of the LED lighting devices 101~108, while MIN represents the minimum intensity/flux of the LED lighting devices 101~108. In formula (2), AREA1 represents the summation of intensity/flux within a duration of a driving cycle when the intensity/flux of the LED lighting devices 101~108 is above its average, while AREA2 represents the summation of intensity/flux within a duration of the driving cycle when the intensity/flux of the LED lighting devices 101~108 is below its average.

As can be seen in FIG. 9, the introduction of the charge storage units C1~C2 can allow (MAX−MIN) in formula (1) and AREA1/AREA2 in formula (2) to be equal to 0, thereby lowering the Percent Flicker and Flicker Index of the LED lighting devices 101~108 substantially.

With the above-mentioned charge storage units and current control units, luminous variation is negligible in the LED lighting device according to the present invention. Therefore, the present invention can provide an LED lighting device capable of improving the flicker phenomenon.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting diode (LED) lighting device, comprising:
    a first luminescent device driven by a rectified alternative-current (AC) voltage for providing light according to first current; and
    a first charge storage unit configured to supply the first current when the rectified AC voltage is smaller than a first voltage established across the first charge storage unit, thereby keeping the first luminescent device turned on; and
    a current controller comprising:
        a first current control unit coupled in series to the first luminescent device and configured to regulate the first current so that the first current does not exceed a first current setting; and a second current control unit coupled in series to the first current control unit and coupled in series to the first charge storage unit, and configured to regulate second current so that the second current does not exceed a second current setting, wherein the second current is an overall current of the LED lighting device.

2. The LED lighting device of claim 1, wherein the first charge storage unit is further configured to stop supplying the first current and start to be charged by the rectified AC voltage when the rectified AC voltage becomes larger than the first voltage.

3. The LED lighting device of claim 1, further comprising a power supply circuit for providing the rectified AC voltage, wherein the second current control unit is coupled between the first current control unit and a negative output end of the power supply circuit.

4. The LED lighting device of claim 1, further comprising a power supply circuit for providing the rectified AC voltage, wherein the second current control unit is coupled between a positive output end of the power supply circuit and the first current control unit.

5. The LED lighting device of claim 1, further comprising a second luminescent device coupled in series to the first luminescent device and coupled in series to the first charge storage unit for providing light according to the second current.

6. The LED lighting device of claim 1, further comprising a voltage clamping unit coupled in parallel with the first current control unit and configured to limit a voltage established across the first current control unit.

7. The LED lighting device of claim 6, wherein the voltage clamping unit includes an LED or Zener diode.

8. The LED lighting device of claim 1, further comprising:
a second charge storage unit configured to supply the first current when the rectified AC voltage is smaller than a sum of the first voltage and a second voltage established across the first charge storage unit and the second charge storage unit, thereby keeping the first luminescent device turned on;
a third current control unit coupled in parallel with the first charge storage unit;
a path controller configured to prevent the first charge storage unit from discharging through the third current controller, wherein:
the second charge storage unit is coupled in series to the third current control unit and coupled in series to the first charge storage unit; and
the first charge storage unit and the second charge storage unit are coupled in parallel with the first luminescent device and the first current controller.

9. The LED lighting device of claim 8, further comprising:
a sensing resistor having a first end coupled to the third current control unit and a second end coupled to the second charge storage unit.

10. The LED lighting device of claim 8, wherein the first charge storage unit and the second charge storage unit are further configured to stop supplying the first current and start to be charged by the rectified AC voltage when the rectified AC voltage becomes larger than the sum of the first voltage and the second voltage.

11. The LED lighting device of claim 8, wherein:
the third current control unit is configured to turn off when the rectified AC voltage is larger than the sum of the first voltage and the second voltage; and
the third current control unit is configured to turn on when the rectified AC voltage is not larger than the sum of the first voltage and the second voltage, thereby regulating third current flowing through the second storage unit so that the third current charging the second storage unit does not exceed a third current setting.

12. The LED lighting device of claim 11, wherein:
the second current setting is larger than the first current setting; and
the third current setting does not exceed a difference between the second current setting and the first current setting.

13. The LED lighting device of claim 8, further comprising a second luminescent device coupled in series to the first luminescent device and coupled in series to the first charge storage unit for providing light according to the second current.

14. The LED lighting device of claim 8, further comprising a voltage clamping unit coupled in parallel with the first current control unit and configured to limit a voltage established across the first current control unit.

* * * * *